United States Patent
Grande Fernández et al.

(10) Patent No.: US 9,951,716 B2
(45) Date of Patent: Apr. 24, 2018

(54) FIXING ANCHOR

(71) Applicant: BorgWarner Emissions Systems Spain, S.L.U, Vigo-Pontevedra (ES)

(72) Inventors: José Antonio Grande Fernández, Vigo (ES); Emilio Vidal, Vigo (ES); Rui Natividade, Salvaterra do Miño (ES)

(73) Assignee: Borgwarner Emissions Systems Spaion, S.L.U., Vigo-Pontevedra (ES)

( * ) Notice: Subject to any disclaimer, the term of this patent is extended or adjusted under 35 U.S.C. 154(b) by 3 days.

(21) Appl. No.: 14/794,357

(22) Filed: Jul. 8, 2015

(65) Prior Publication Data
US 2016/0010586 A1    Jan. 14, 2016

(30) Foreign Application Priority Data
Jul. 9, 2014 (EP) .................................. 14382265

(51) Int. Cl.
| | |
|---|---|
| F16B 9/00 | (2006.01) |
| F02F 7/00 | (2006.01) |
| F16M 7/00 | (2006.01) |
| F16B 5/08 | (2006.01) |
| F02M 26/29 | (2016.01) |

(52) U.S. Cl.
CPC ........... *F02F 7/0095* (2013.01); *F02M 26/29* (2016.02); *F16B 5/08* (2013.01); *F16M 7/00* (2013.01)

(58) Field of Classification Search
USPC ...................... 403/23, 72, 79, 161, 168, 337
See application file for complete search history.

(56) References Cited

U.S. PATENT DOCUMENTS

| | | | | | |
|---|---|---|---|---|---|
| 3,160,422 | A | * | 12/1964 | Energren ................. | B60G 7/02 280/93.508 |
| 4,648,624 | A | * | 3/1987 | Mouhot ................. | B62D 1/184 269/228 |
| 4,788,880 | A | * | 12/1988 | Kester .................... | B62D 1/184 403/408.1 |
| 5,026,028 | A | * | 6/1991 | Ooi ..................... | E04F 11/1834 248/251 |
| 5,088,767 | A | * | 2/1992 | Hoblingre ................. | F16B 2/16 280/775 |
| 5,294,149 | A | * | 3/1994 | Haldric .................. | B62D 1/189 280/775 |

(Continued)

FOREIGN PATENT DOCUMENTS

| | | |
|---|---|---|
| FR | 2491024 | 4/1982 |
| GB | 2379000 | 2/2003 |

*Primary Examiner* — Bradley Duckworth
(74) *Attorney, Agent, or Firm* — Miller Canfield

(57) ABSTRACT

A device for anchoring components or parts to a rigid element, such as an engine block, for example, or to intermediate elements which are in turn fixed to rigid elements, such as an intermediate pin mounted on the engine block, for example. The anchor consists of a structure which can be manufactured from stamped and punched sheet metal parts giving rise to an inexpensive and easy-to-manufacture component. The particular configuration based on stamped and punched sheet metal parts shows high rigidity and is particularly suitable for anchoring heavy components. The fixing anchor is suitable for bolted joints of the components or parts.

10 Claims, 4 Drawing Sheets

(56) References Cited

U.S. PATENT DOCUMENTS

| | | | | | |
|---|---|---|---|---|---|
| 5,320,443 | A | * | 6/1994 | Lien | E02F 9/006 403/154 |
| 5,598,741 | A | * | 2/1997 | Mitchell | B62D 1/184 74/493 |
| 5,951,192 | A | * | 9/1999 | Collins | E02F 3/3622 37/468 |
| 6,073,965 | A | * | 6/2000 | Kinoshita | B62D 1/184 280/775 |
| 6,152,642 | A | * | 11/2000 | Berthold | B60T 7/042 24/669 |
| 6,964,432 | B2 | * | 11/2005 | Morita | B62D 1/184 280/775 |
| 8,752,234 | B2 | * | 6/2014 | Ku | B60S 1/3801 15/250.31 |

* cited by examiner

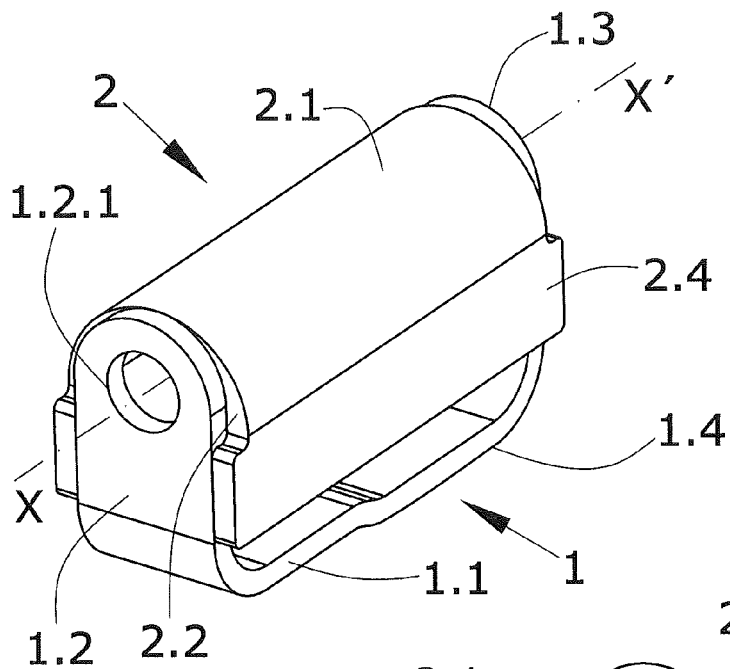
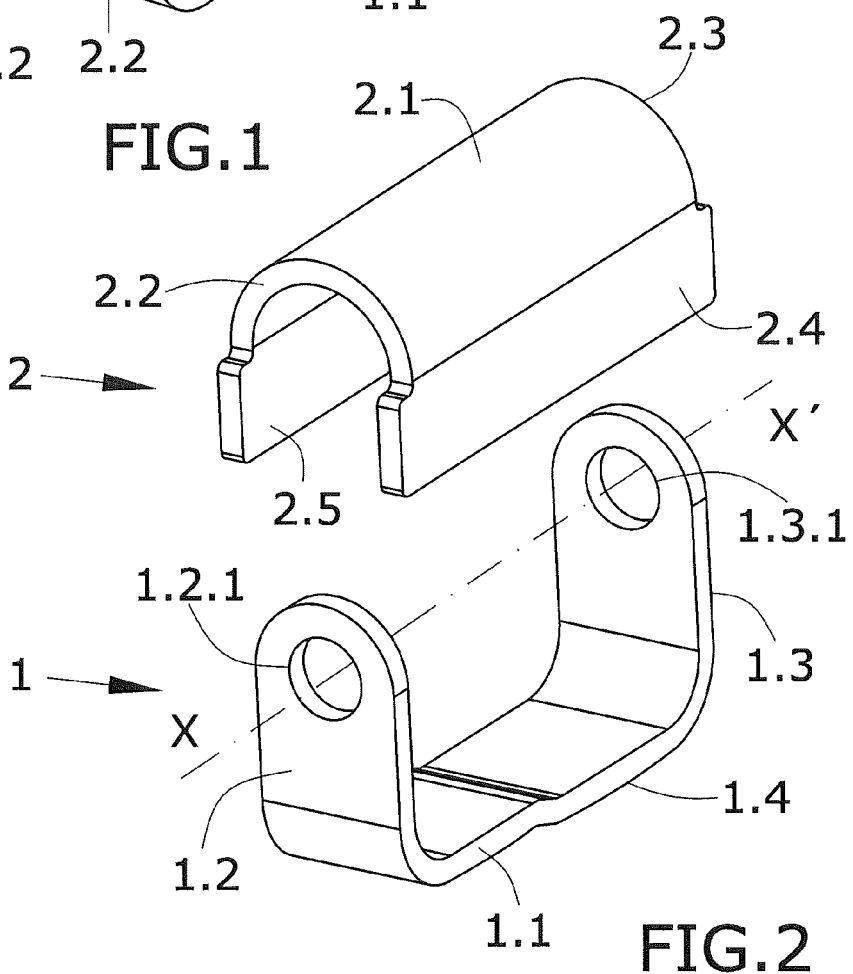

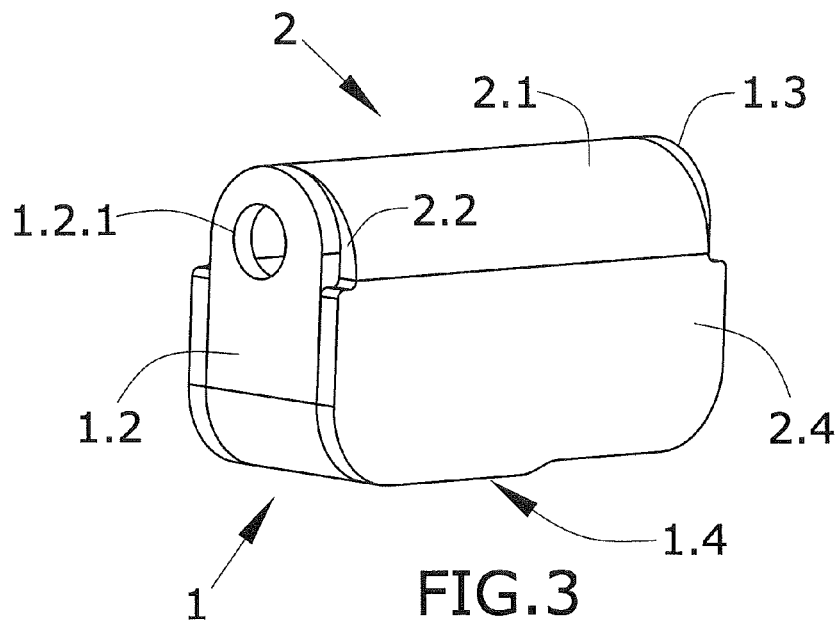
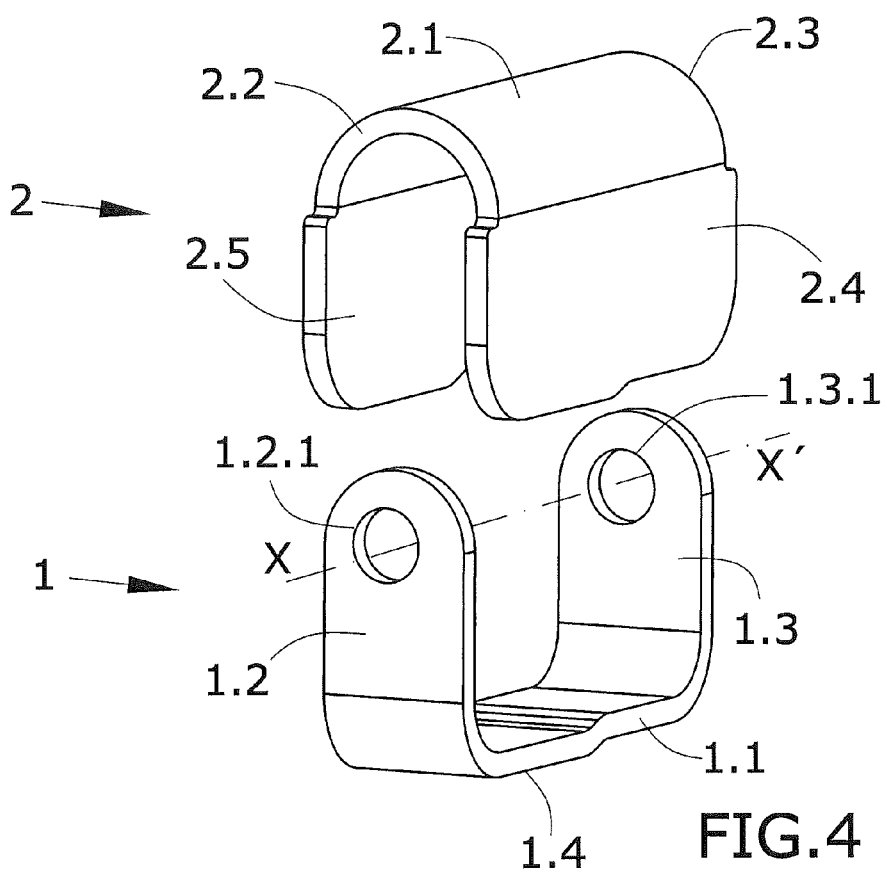

FIXING ANCHOR

RELATED APPLICATIONS

This application claims priority to and all the benefits of European Application No. 14382265.8, filed Jul. 9, 2014.

BACKGROUND OF THE INVENTION

1. Field of the Invention

The present invention relates to a device for anchoring components or parts to a rigid element, such as an engine block, for example, or to intermediate elements which are in turn fixed to rigid elements, such as an intermediate pin mounted on the engine block, for example.

More specifically, the anchor according to the invention comprises a structure which can be manufactured from stamped and punched sheet metal parts giving rise to an inexpensive and easy-to-manufacture component. The particular configuration based on stamped and punched sheet metal parts shows high rigidity, and the resulting anchor is particularly suitable for anchoring heavy components.

The fixing anchor of the invention is suitable for bolted joints of the components or parts.

2. Description of the Related Art

Securing a part or a component to any rigid element of an internal combustion engine, or to an intermediate element which is in turn fixed on a rigid element, requires a suitable anchoring system.

Particularly, the anchoring system allows securing components such as a heat exchanger of an EGR (Exhaust Gas Recirculation) system to a rigid component, such as the engine block, for example, or to an intermediate component, such as an intermediate pin, for example.

An anchor suitable for anchoring the components is obtained by means of a bolted joint, requiring a housing for housing the fastener which allows the joining. The bolted joint allows suitable support if the components to be fixed are heavy.

A known way to provide a housing serving as a guiding support for the fastener in the bolted joint is to manufacture same as an integral part of the component to be secured by means of molding or casting techniques. The drawback of this anchoring system manufacturing technique is that since the element is obtained by casting, it is heavy and has a high manufacturing cost. In many cases, the existence of through holes or cavities involves the use of cores and moving parts in molds, making manufacture considerably more expensive.

The anchor for the components can also be obtained through an angle bracket-type support. The support can be obtained in one piece by means of stamping and allows the bolted joint of both components acting only as a support. The drawback of the support is its low rigidity, so it is not suitable for securing heavy components.

The guiding support for a bolted joint according to the present invention is suitable for anchoring any component and prevents the problems existing in the previously mentioned solutions.

SUMMARY OF THE INVENTION

A first inventive aspect provides a fixing anchor for bolted joints suitable for being secured on a support surface, i.e., suitable for securing at least one device or device assembly to engine blocks or intermediate components mounted on engine blocks for internal combustion engines. The fixing anchor according to this first inventive aspect comprises:

a bent and punched sheet metal base configured according to a first longitudinal segment having a joining surface for joining same to the support surface by welding, a first end flange prolonging from one of the ends of the first longitudinal segment, and a second end flange prolonging from the opposite end of the first longitudinal segment, where both flanges are arranged transverse to the first longitudinal segment and essentially parallel to one another, and where both end flanges comprise a hole such that the line extending between the centers of both holes establishes the longitudinal direction X-X' in which a fastener suitable for the anchor extends, a bent and punched sheet metal compression part configured according to a segment having a cylindrical sector where the steering axis thereof is parallel to the direction X-X' and the segment having a cylindrical sector extends longitudinally from the first end flange to the second end flange; and comprises a force transmission surface at each longitudinal end of the compression part where one force transmission surface is in contact with the first end flange of the base, and the other force transmission surface is in contact with the second end flange of the base, where the base and the compression part are joined by welding at least between the surfaces of the end flanges of the base and the force transmission surfaces of the compression part which are in contact with one another.

The fixing anchor according to the invention has a configuration formed by two portions, requiring simple manufacturing processes and tools. This has the advantage of a lower manufacturing cost in addition to greater robustness of the anchor resulting from its construction.

The first part of the anchor is a base manufactured from bent and punched sheet metal which is joined to the component to be anchored by means of any joining technique, preferably brazing.

The sheet metal base is formed by a first longitudinal segment which is directly linked to the element to be anchored, preferably by means of welding. In the preferred embodiments, this first longitudinal segment extends according to the longitudinal direction X-X', although according to other embodiments it can have steps, bends or even oblique segments which allow joining same on surfaces of the rigid element acting as a support that are not necessarily planar.

The base also comprises two flanges transverse to the first longitudinal segment which in turn have holes between which there is housed the fastener which allows the bolted joining of the component to be anchored on the rigid element. These flanges will be described in the preferred examples as being essentially perpendicular to the first longitudinal segment, although other examples in which the flanges show a specific inclination with respect to the perpendicular direction to adapt the orientation of the fastener with respect to the surface to which the anchor according to the invention is joined, are possible.

This first part of the anchor, the base, could also be joined by means of any joining technique such as welding, for example, both to the engine block and to any intermediate element which is joined to the engine block and will receive the device or device assembly at hand.

Although the anchor comprises a configuration which allows joining it to any of the main bodies of the devices to be joined, it is preferably located on the devices or device assemblies to be anchored, given that joining it to the devices is easier than having to attach it to the block or any intermediate system.

The second part of the anchor is a compression part, also manufactured using bent and punched sheet metal, receiving through the force transmission surfaces the force transferred to it by the flanges of the sheet metal base when the bolted joint anchors the component or components to the rigid element.

The compression part is configured such that it comprises a segment having a cylindrical sector, the cylindrical sector being understood in its broadest sense, i.e., as a sector defined by a generatrix shifting in a direction defined by a directrix. In the embodiments that will be described below the generatrix is an arc of circumference of 180°, and the directrix is the straight line defined by the longitudinal direction X-X' established between the centers of the holes of the flanges.

In addition to this segment having a cylindrical sector which is responsible for absorbing compressive forces, the present invention has respective force transmission surfaces for receiving the compressive force applied by the bolt when it goes through the holes and establishes fixing, making use of a nut-bolt pair, for example.

In most embodiments, the force transmission surfaces are located such that they contact the surfaces of the flanges of the base arranged facing one another. The force transmission surfaces are normal to the bolt or fastener tightening direction and therefore adapted to work under compression.

According to other examples, the force transmission surfaces are parallel to the bolt tightening direction and therefore to the joint between the two surfaces; when it is subjected to forces due to the action of the bolt or fastener, the forces are primarily shear forces. Notwithstanding the foregoing, once the force is transferred from the joint to the compression part, in regions other than the joint area the part has a stress state, essentially a compressive stress state, along the longitudinal direction.

According to other embodiments, this cylindrical sector is generated according to a generatrix curve having straight extensions giving rise to skirts which increase rigidity and facilitate guiding and positioning between the base and the compression part during manufacture, for example.

Both parts are joined to one another by means of welding, preferably by means of brazing, at least on the force transmission surfaces, in contact with the end flanges of the sheet metal base. The combination of both parts, the base and the compression part, gives rise to a hollow body that allows compression applied by the bolt and at the same time provides stability against forces both in the direction X-X' coinciding with the direction of the bolt and in the transverse direction. This rigidity is important in an environment where vibrations exist since the supported element is an element with a high inertial mass.

The importance of the compression part in the absorption of compressive forces generated by the fastener or bolt has been described in the description of the part since these forces give rise to a high stress state mainly in this compression part. Nevertheless, the forces applied by the inertial effect of the device which is anchored by means of the anchor due both to the accelerations to which the device is subjected and to vibration are also important. These forces are not necessarily in the direction of the fastener but rather can be applied in any direction.

The configuration of the anchor formed by two curved parts in directions perpendicular to one another giving rise to a hollow volume provides a body offering high rigidity in any direction. This rigidity is not due to the thickness of the sheet metal of each of the components but to the combination of two curved bodies in perpendicular directions such that each of them provides rigidity in a different direction according to the direction in which stressing is produced. This results in high rigidity regardless of the direction in which the external stress or force is produced.

In a particular example, a device assembly comprises one or more fixing anchors according to the first inventive aspect whereby the fixing thereof on the engine block or any intermediate element is advantageously easier and more robust, and the joint has greater rigidity. This in turn allows correctly fixing heavy device assemblies.

When brazing is used, providing a free surface in the device to be anchored is enough to enable incorporating the anchor according to the invention.

BRIEF DESCRIPTION OF THE DRAWINGS

The foregoing and other features and advantages of the invention will be more clearly understood based on the following detailed description of a preferred embodiment provided by way of illustrative and non-limiting example in reference to the attached drawings.

FIG. 1 shows a perspective view of a first embodiment of a fixing anchor already assembled.

FIG. 2 shows an exploded view of the parts comprising the embodiment of the fixing anchor of the preceding figure.

FIG. 3 shows a perspective view of another embodiment of a fixing anchor already assembled.

FIG. 4 shows an exploded view of the parts comprising the embodiment of the fixing anchor of the preceding figure.

DETAILED DESCRIPTION OF THE INVENTION

Figure 5:
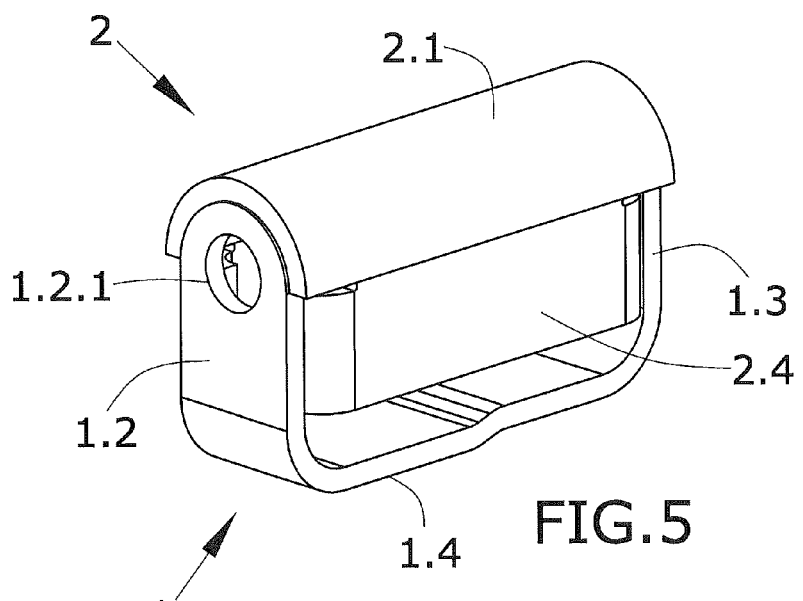
FIG. 5 shows a perspective view of another embodiment of a fixing anchor already assembled.

According to the first inventive aspect, the present invention relates to a fixing anchor device for bolted joints suitable for being secured on a support surface, which allows securing at least one device either to an engine block or to an intermediate element which is in turn fixed to the engine block.

The dependent claims define preferred embodiments of the invention. All the features described in this description including the independent claims, dependent claims, description and drawings can be combined in any combination, except for combinations of such mutually excluding features.

FIG. 1 shows a perspective view of an embodiment of the anchor, and FIG. 2 shows an exploded view of the parts comprised in the anchor according to the example shown FIG. 1.

In this particular example, the fixing anchor comprises two main portions which are joined to one another. The first main part is a bent and punched sheet metal base (1) which comprises a first longitudinal segment (1.1).

A first end flange (1.2) and a second end flange (1.3) extend, as a prolongation of both ends of the first longitudinal segment (1.1), in a direction essentially perpendicular to the longitudinal direction X-X'. The first and second end flanges (1.2, 1.3) receive the bolt tightening forces once the bolted joint is established, and the tightening in turn gives rise to the occurrence of compressive forces on other portions of the anchor.

Additionally, the first end flange (1.2) and second end flange (1.3) comprise holes (1.2.1, 1.3.1) for housing a bolt or fastener of the bolted joint. The holes (1.2.1, 1.3.1) are through holes in both end flanges (1.2, 1.3) and allow the passage of the fastener. The centers between holes (1.2.1, 1.3.1) define the longitudinal direction X-X'. The fastener extends according to this direction X-X' and in this embodiment, the first longitudinal segment (1.1) extends according to the same longitudinal direction X-X'.

In this particular example, the end flanges (1.2, 1.3) comprise ends having a semicircular configuration. This facilitates assembling the anchor since this semicircular configuration easily adapts to the semicircular section of another part, i.e., the compression part (2).

On the other hand, the first longitudinal segment (1.1) has a joining surface (1.4) which allows joining the anchor by means of any joining technique, preferably brazing, to the device or device assembly to be anchored.

As shown in FIGS. 1 and 2, in this particular example the joining surface (1.4) is a protruding region of the first longitudinal segment (1.1), particularly configured by means of a spaced double stepping in the longitudinal direction X-X'. This advantageously allows the anchor to adapt to the shape of the device to which it will be joined, such that the joint is more robust.

The second main part is a bent and punched sheet metal compression part (2). This entails an advantage in terms of manufacture given that it is simpler and less expensive.

The compression part (2) is configured according to a segment having a cylindrical sector (2.1), the directrix of which extends in the longitudinal direction X-X'. The cylindrical sector extends between the two end flanges (1.2, 1.3).

The compression part (2) in turn comprises at each end a force transmission surface (2.2, 2.3), which are surfaces adapted to work under compression in this embodiment and in the next two embodiments. These force transmission surfaces (2.2, 2.3) are located at each longitudinal end of the segment having a cylindrical sector (2.1) of the compression part (2), such that they contact the base (1). In this embodiment, each of the force transmission surfaces (2.2, 2.3) is supported on the inner face of the end flanges (1.2, 1.3), i.e., the faces facing one another. Therefore, the compressive force applied by the fastener or bolt in the bolted joint is received by the end flanges (1.2, 1.3) and transmitted to the force transmission surface (2.2, 2.3). This compressive force is supported by the cylindrical sector (2.1) having a circular section showing high stability against buckling in response to compressive force.

Additionally, the compression part (2) comprises in this particular example a skirt (2.4, 2.5) on each side of the cylindrical sector (2.1) having a circular section. In this particular case, the skirts (2.4, 2.5) can be interpreted as a prolongation on both sides of the cylindrical sector (2.1) having a circular section, or as a portion of the cylindrical sector (2.1), making use of the broadest interpretation of the term "cylindrical" where the generatrix is formed by a 180° arc prolonged at both ends by means of respective straight segments. The segment having a 180° arc gives rise to the cylindrical sector (2.1) having a circular section, and the straight segments give rise to the skirts (2.4, 2.5). In this particular case, the force transmission surface (2.2, 2.3) extends both to the cylindrical segment (2.1) having a circular section and to the straight segments when they are joined to the base (1) by welding.

The height of the skirts (2.4, 2.5) is less than the total height of the anchor once it has been assembled. The skirts (2.4, 2.5) therefore do not completely cover the length of the end flanges (1.2, 1.3). However, the skirts (2.4, 2.5) are laterally fitted either to one of the end flanges (1.2, 1.3) or to both, as shown in FIGS. 1 and 2. This advantageously facilitates assembling the anchor by providing a larger contact area between the base (1) and the compression part (2) for joining it and for a guiding that allows better positioning between both during manufacture.

The base (1) and the compression part (2) are joined by welding, preferably brazing, at least on the surfaces of the end flanges (1.2, 1.3) of the base (1) in contact with the compression surfaces (2.2, 2.3) of the compression part (2). This advantageously allows a strong joint between the two parts, supporting the force applied on the bolted joint.

In this particular example, the ends of the skirts (2.4, 2.5) are also welded to the side ends of the end flanges (1.2, 1.3), increasing rigidity of the assembly.

FIGS. 3 and 4 show another particular example of the invention. The particular example shares the features explained in the example shown in FIGS. 1 and 2, except for the configuration of the skirts (2.4, 2.5).

In this particular example, the perimetral edge of the skirts (2.4, 2.5) has a configuration coinciding with the configuration of the base, closing a volume between the base (1) and the compression part (2).

Therefore, the windows shown between the two parts forming the anchor in the first embodiment are non-existent. This advantageously allows having a larger welding area between both portions given that the perimetral edge of the base (1) and the compression part (2) coincide. This additionally allows better positioning of both parts for assembly as well as greater rigidity of the assembly against forces applied on the anchor in the longitudinal direction X-X'. An important source of such forces is a force due to vibrations.

Like in the preceding example, the compressive forces generated by the bolted joint are transmitted from the end flanges (1.2, 1.3) to the force transmission surfaces (2.2, 2.3) in contact with them. These forces are compressive forces on the surfaces (2.2, 2.3). Therefore, like in the preceding example, the skirts (2.4, 2.5) contribute to the rigidity of the anchor against compressive forces.

Figure 6:
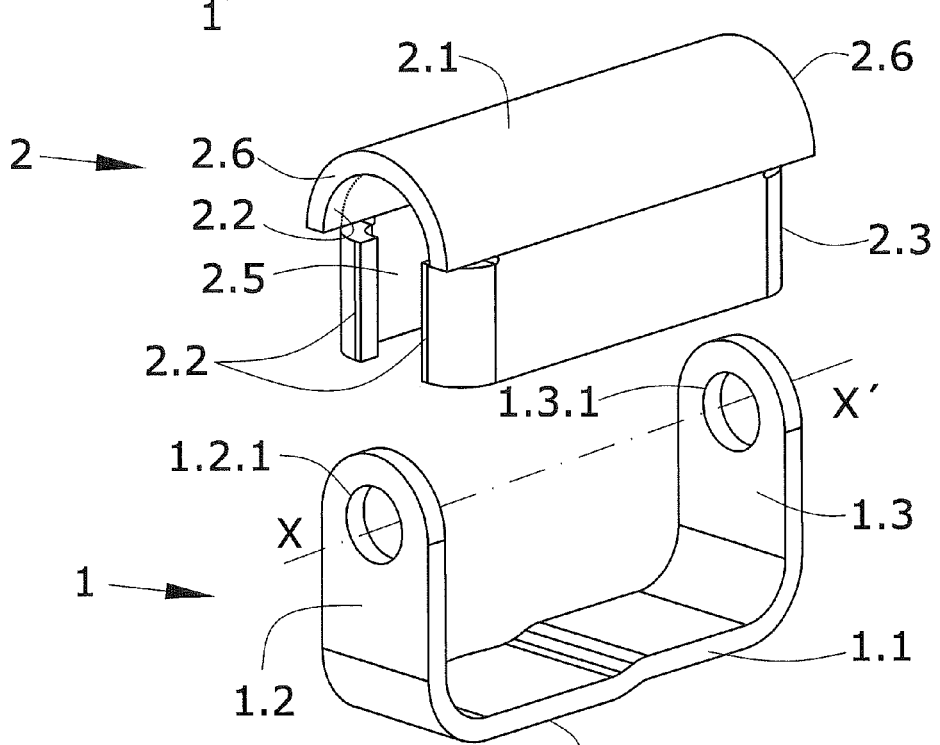
FIG. 6 shows an exploded view of the parts comprising the embodiment of the fixing anchor of the preceding figure.

FIGS. 5 and 6 show another particular example sharing the configuration of the base (1) with the first example but not the configuration of the compression part (2).

In this particular example, the compression part (2) has a cylindrical sector (2.1) comprising skirts (2.4, 2.5) configured as prolongations on both sides of the cylindrical sector (2.1).

The ends of the skirts (2.4, 2.5) in turn comprise bent prolongations which are parallel to the end flanges (1.2, 1.3) of the base (1). The prolongations, which are bent such that they are facing one another, comprise compression surfaces (2.2, 2.3). The compression surfaces (2.2, 2.3) are in contact with the end flanges (1.2, 1.3).

Therefore in this particular example, part of the compressive forces generated by the bolted joint are transmitted from the inner face of the end flanges (1.2, 1.3) to the compression surfaces (2.2, 2.3) of the skirts (2.4, 2.5), and are also supported in the cylindrical sector (2.1), like in the preceding examples.

Contact between the compression surfaces (2.2, 2.3) and the inner face of the end flanges (1.2, 1.3) allows joining them together by means of welding, preferably brazing, for assembling the base (1) and the compression part (2) of the anchor.

The welding which allows joining both portions also transmits shear forces generated by the bolted joint.

Additionally, the skirts (2.4, 2.5) of this embodiment do not comprise a perimetral edge coinciding with the configuration of the base, thus closing a volume between the base (1) and the compression part (2) as in the second particular example. This reduces the possible welding area between parts. Nevertheless, according to other embodiments, part of the skirts (2.4, 2.5) could be extended in conformity with the configuration of the base part (1).

In this particular example, the cylindrical sector (2.1) has a support prolongation or extension (2.6) at each of its ends, where each support prolongation (2.6) is adapted to be supported on the perimetral edge of the end of the corresponding end flange (1.2, 1.3). This advantageously allows better positioning of the base (1) and the compression part (2) of the anchor for a simpler assembly of the anchor before performing the final welding. The inner face of the support prolongation (2.6) is therefore supported on the perimetral edge of the end flanges (1.2, 1.3), which allows joining them by welding, preferably brazing. In this particular case, joining the support prolongation (2.6) and the flanges (1.2, 1.3) by welding gives rise to a force transmission surface (2.2, 2.3) working under shearing.

Figure 7:
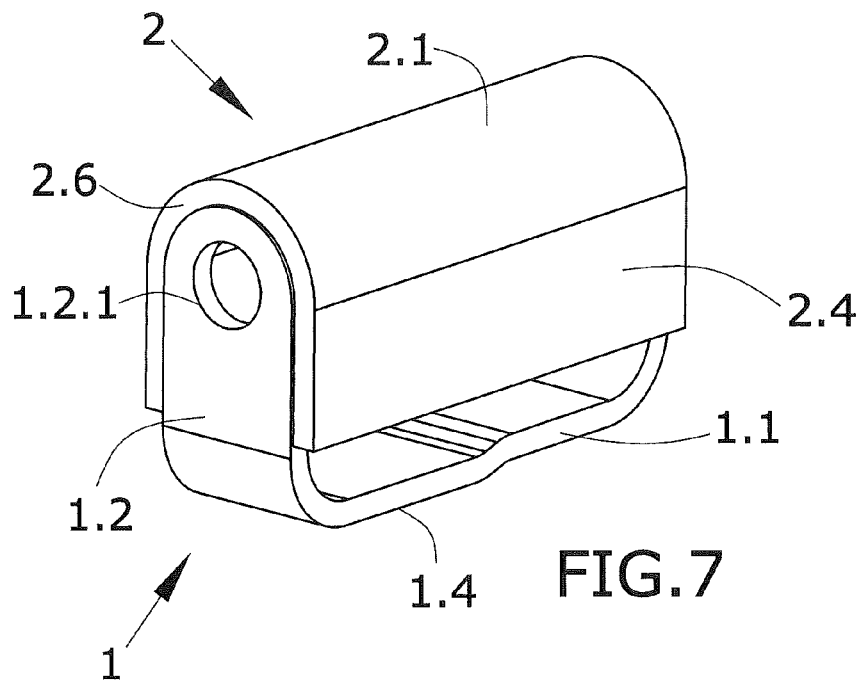
FIG. 7 shows a perspective view of another embodiment of a fixing anchor already assembled.
Figure 8:
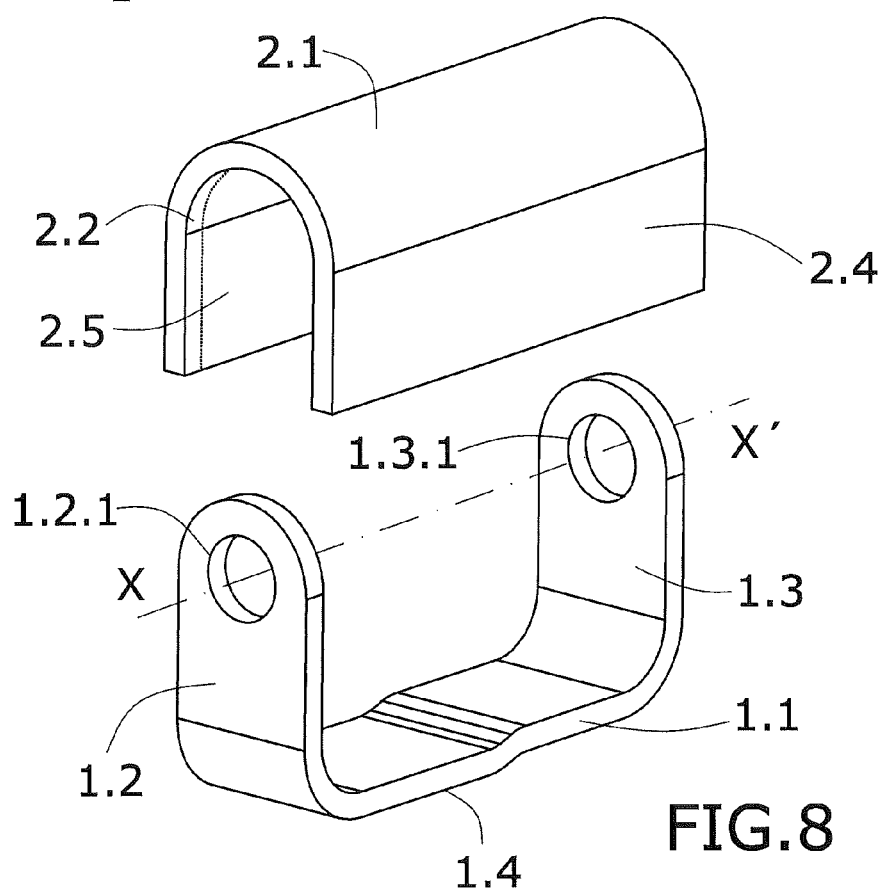
FIG. 8 shows an exploded view of the parts comprising the embodiment of the fixing anchor of the preceding figure.

FIGS. 7 and 8 show another embodiment in which the compression part (2) has a support prolongation (2.6) at both ends. This support prolongation (2.6) is what contacts the perimeter of the end flanges (1.2, 1.3) forming the force transmission surface (2.2, 2.3), which works under shearing. The support prolongation (2.6) also extends along its skirts (2.4, 2.5), increasing contact with the perimetral edge of the flanges (1.2, 1.3). In this embodiment, the joint between the base (1) and the compression part (2) as a whole works under shearing when the anchor is subjected to compression by means of the bolt or fastener.

What is claimed is:

1. A fixing anchor for bolted joints suitable for being secured on a support surface, comprising:
    a bent and punched sheet metal base having a first longitudinal segment having a joining surface for joining the same to the support surface by welding,
    a first end flange extending from one end of the first longitudinal segment, and a second end flange extending from the opposite end of the first longitudinal segment, wherein both flanges are arranged transverse to the first longitudinal segment and essentially parallel to one another, and wherein both end flanges comprise a hole such that a line extending between the centers of the two holes establishes a longitudinal direction X-X' for a screw fastener to be inserted, and
    a bent and punched sheet metal compression part having a segment having a partially cylindrical sector where a steering axis thereof is parallel to direction X-X', wherein said segment having said partially cylindrical sector extends longitudinally from the first end flange to the second end flange and wherein the segment having said partially cylindrical sector of the compression part is extended on both lateral sides into respective skirts; and
    a force transmission surface at each longitudinal end of the compression part, wherein one said force transmission surface is in contact with the first end flange of the base, and another said force transmission surface is in contact with the second end flange of the base, and wherein the first and second end flanges enclose and contact the respective force transmission surface;
    wherein the base and the compression part are joined by welding at least between the surfaces of the end flanges of the base and the force transmission surfaces of the compression part, such that they contact the base.

2. The anchor according to claim 1, wherein the force transmission surface allows compression such that one said force transmission surface is located in the end of the compression part oriented towards the first end flange of the base, and the other said force transmission surface is located at the opposite end of the compression part oriented towards the second end flange.

3. The anchor according to claim 1, wherein the joining surface is a protruding region of the first longitudinal segment.

4. The anchor according to claim 3, wherein the protruding region is a spaced double stepping in the longitudinal direction X-X'.

5. The anchor according to claim 1, wherein the end of the first end flange, the end of the second end flange or both have a semicircular configuration.

6. The anchor according to claim 1, wherein the perimetral edge of the skirts has a configuration coinciding with the configuration of the base, closing a volume between the base and the compression part.

7. The anchor according to claim 1, wherein the skirts are fitted on the lateral side of the first end flange, and the lateral side of the second end flange.

8. The anchor according to claim 7, wherein the ends of the skirts comprise bent extensions parallel to the first and second end flanges and where the force transmission surfaces which allow compression are located on the surfaces of the bent extensions in contact with said first and second end flanges.

9. The anchor according to claim 1, where the segment having the partially cylindrical sector of the compression part has a support extension at each of its ends, where each said support extension is supported on the end of the corresponding end flange.

10. The anchor according to claim 9, where the support extension is at least a portion of the force transmission surface.

* * * * *